April 12, 1960     J. NEUKIRCH     2,932,255
ECCENTRIC DRIVE MECHANISM
Filed July 26, 1955     5 Sheets-Sheet 1
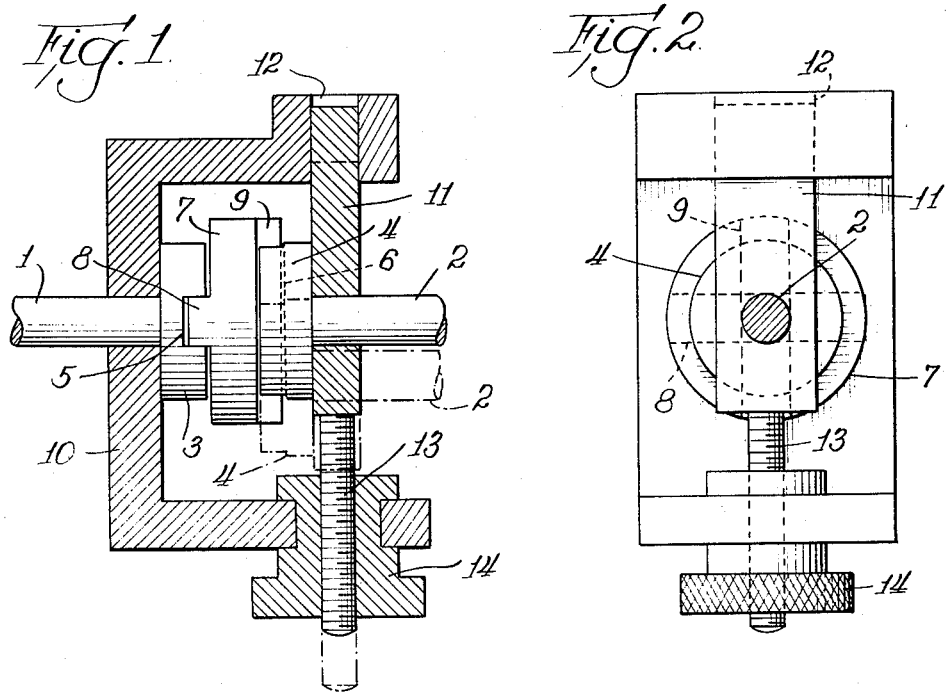
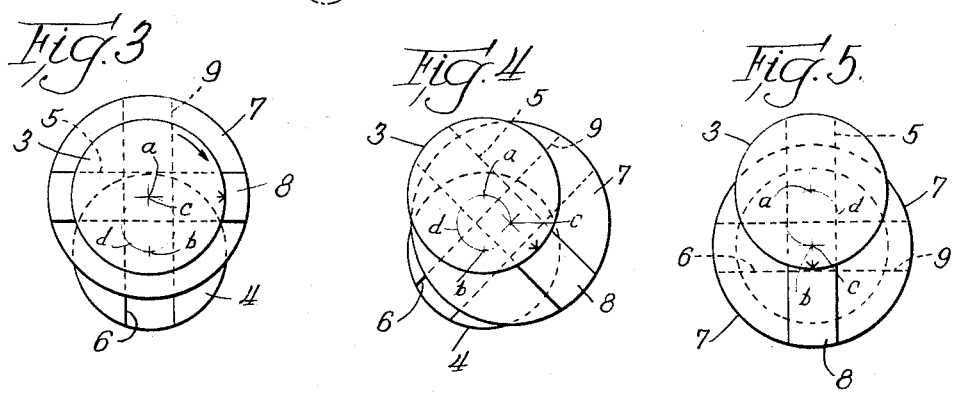
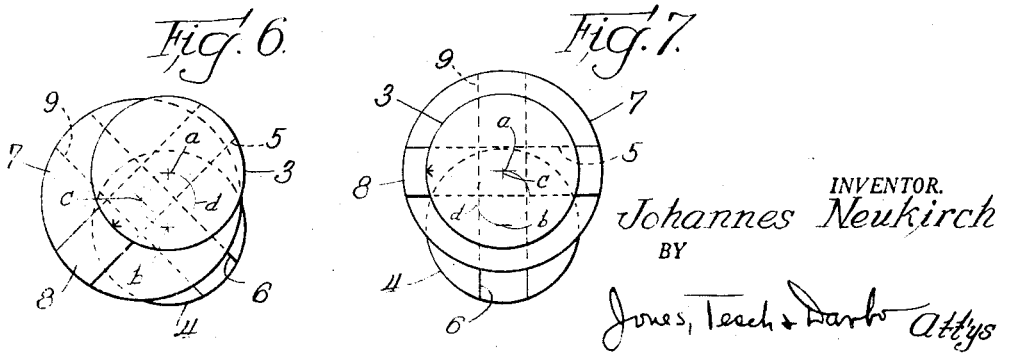
INVENTOR.
Johannes Neukirch
BY
Jones, Tesch & Darbo Att'ys April 12, 1960    J. NEUKIRCH    2,932,255
ECCENTRIC DRIVE MECHANISM
Filed July 26, 1955    5 Sheets-Sheet 2
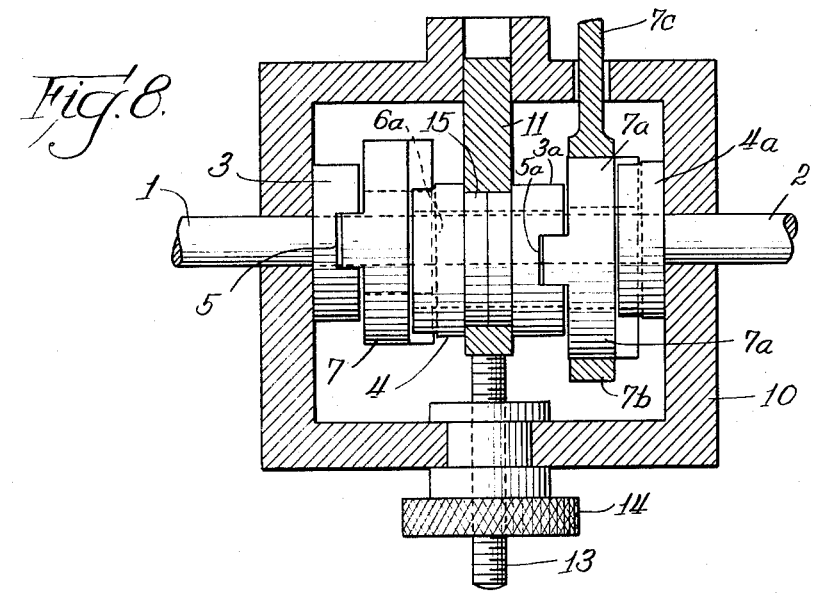
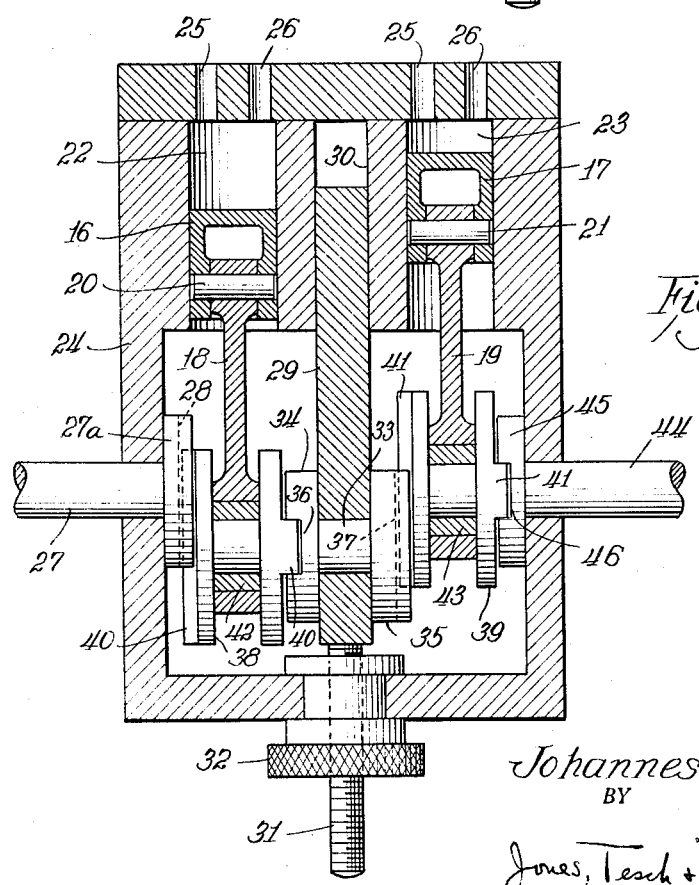
INVENTOR.
Johannes Neukirch
BY
Jones, Tesch & Darby Att'ys.

April 12, 1960  J. NEUKIRCH  2,932,255
ECCENTRIC DRIVE MECHANISM
Filed July 26, 1955  5 Sheets-Sheet 3
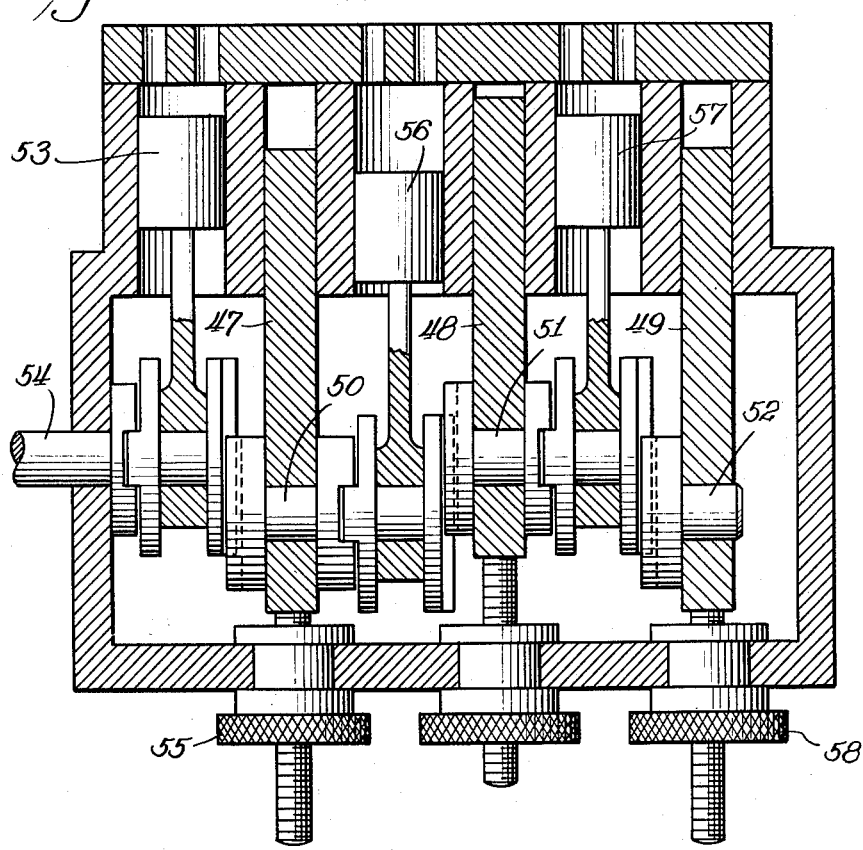
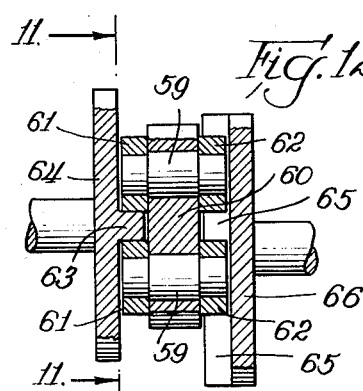
INVENTOR.
Johannes Neukirch April 12, 1960

J. NEUKIRCH 2,932,255

ECCENTRIC DRIVE MECHANISM

Filed July 26, 1955

INVENTOR.
Johannes Neukirch
BY
Jones, Tesch & Danbo
Attys

April 12, 1960
J. NEUKIRCH
2,932,255
ECCENTRIC DRIVE MECHANISM
Filed July 26, 1955
5 Sheets-Sheet 5
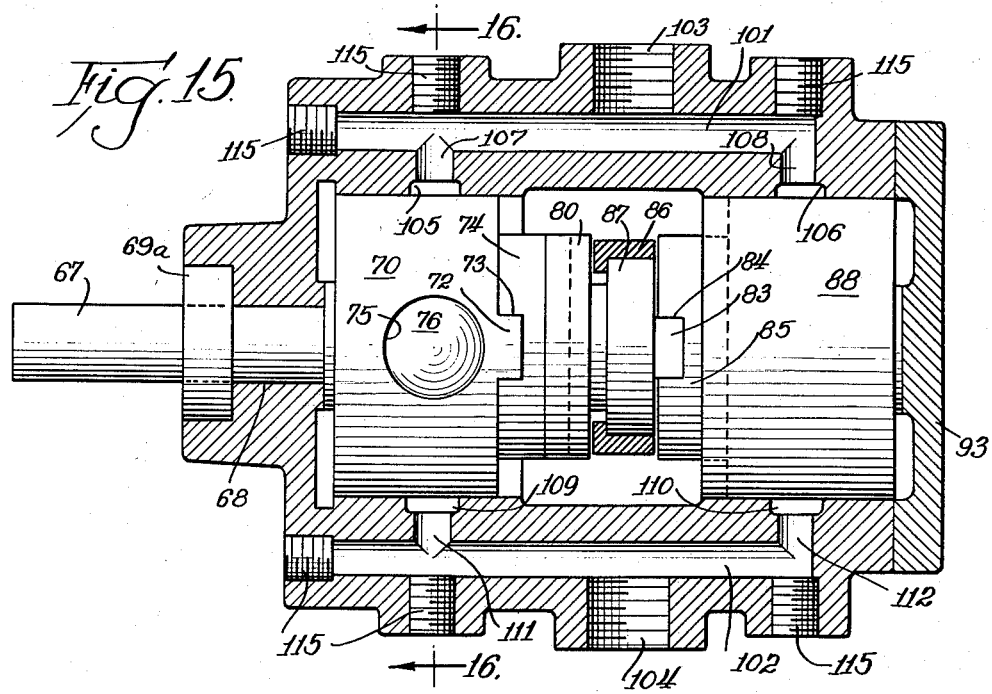
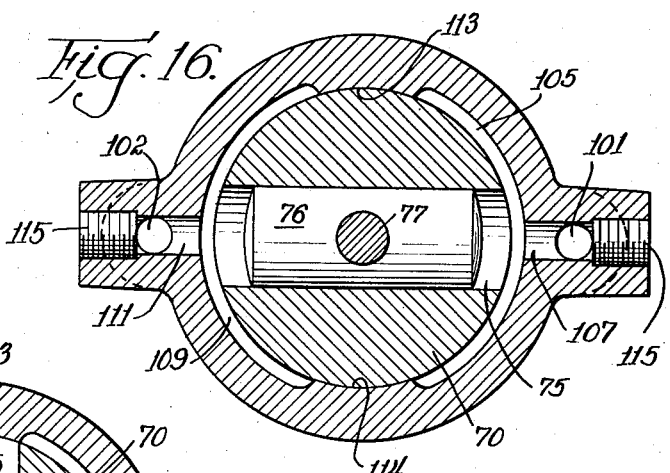
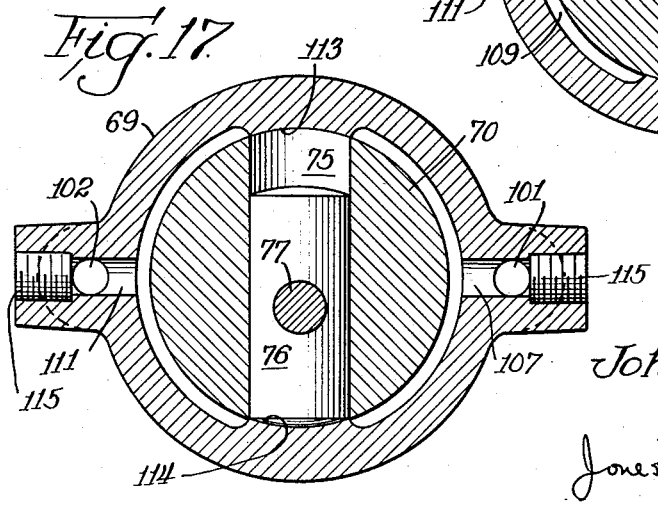
INVENTOR.
Johannes Neukirch
BY
Jones, Tesch + Darbo Attys.

United States Patent Office 2,932,255
Patented Apr. 12, 1960

2,932,255

ECCENTRIC DRIVE MECHANISM

Johannes Neukirch, Bad Durkheim, Pfalz, Germany, assignor of one-half to Lora H. Neukirch, Park Ridge, Ill.

Application July 26, 1955, Serial No. 524,334

4 Claims. (Cl. 103—160)

This invention relates to mechanisms for converting the rotary motion of a shaft, for example, to eccentric revolution and, in most applications, to reciprocating motion along a line path at right angles to the shaft. More specifically, it relates to an eccentric drive mechanism with means for adjusting the degree of eccentricity of the eccentric driving element and thus the length of stroke of the reciprocating element.

Mechanisms for changing rotary motion to reciprocating motion employing cranks, cams, and eccentric disks have long been used in a wide variety of applications. The throw, and, therefore, extent of travel of the reciprocating element, is usually fixed, being determined by the dimensional characteristics of the driving element.

The principal object of the invention is to provide an eccentric driving mechanism which is adjustable with respect to the degree of eccentricity and which is extremely simple in the construction and arrangement of its elements. A further object is to provide such a drive which executes two complete cycles for each complete rotation of the driving shaft, thus doubling output motion frequency. A further object is to provide such a mechanism which is counterbalanced by simple means which automatically adjust to adjustment of the eccentricity of the drive.

Another object of the invention is to provide, by way of example of an application of the adjustable eccentric drive mechanism, a pump of the reciprocating type wherein the stroke of the piston or pistons is adjustable by virtue of the adjustability of the drive mechanism. A still further object is to provide a pump having a plurality of cylinders the stroke of the pistons of which may be independently or collectively adjusted.

In the accompanying drawings:

Fig. 1 is a cross-sectional view showing an Oldham coupling with means for altering the degree of eccentricity of the input and output shafts;

Fig. 2 is a view of the mechanism of Fig. 1 taken at the right hand side thereof;

Figs. 3-7 are diagrammatic representations of the disk elements of the Oldham coupling of Fig. 1 and illustrating the motion thereof;

Fig. 8 is a view similar to that of Fig. 1 showing a counterbalanced mechanism;

Fig. 9 is a cross-sectional view of a two-piston pump incorporating the eccentric drive mechanism of the invention;

Fig. 10 is a cross-sectional view of a three-piston pump with means for independently adjusting the strokes of the several pistons;

Fig. 11 is a view taken at the line 11—11 of Fig. 12 showing an alternative form of the driving disk elements;

Fig. 12 is a view taken at the line 12—12 of Fig. 11.

Fig. 15 is a further view, partly in section, of the pump of Fig. 13 and taken at the line 15—15 of Figs. 13 and 14;

Figure 16 is a cross-sectional view taken at the line 16—16 of Fig. 15 and showing a piston of the pump in its intermediate position, and Fig. 17 is a view similar to that of Fig. 16, showing the piston at one end of its stroke for maximum pumping capacity.

Figure 13:
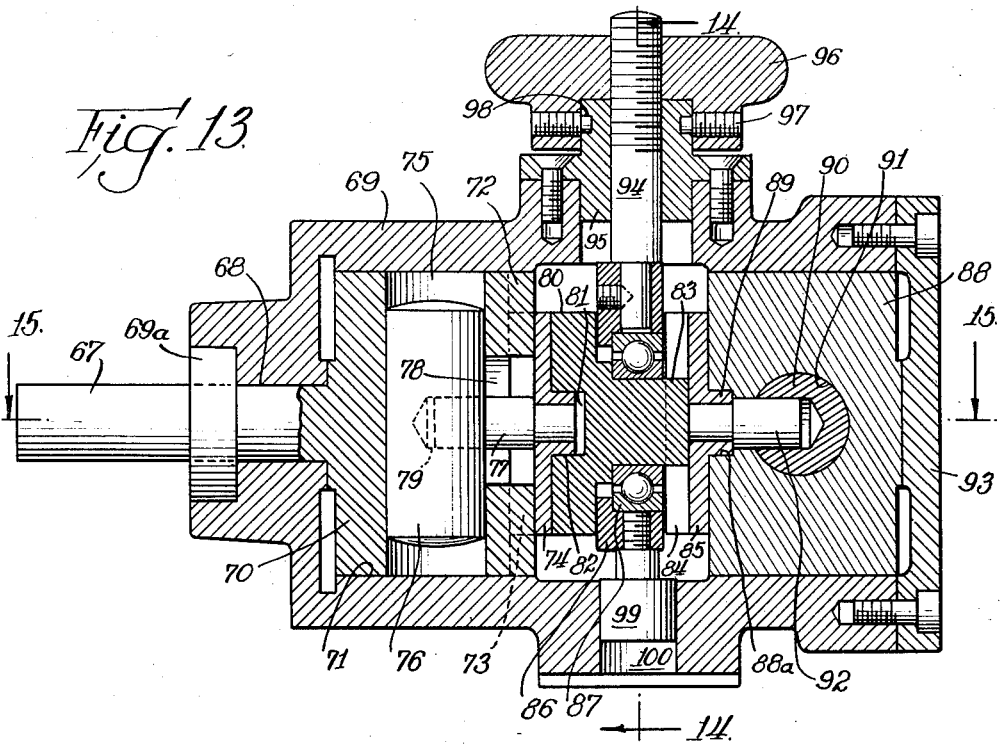
Fig. 13 is a vertical longitudinal sectional view of a two-piston pump differing in arrangement from that of Fig. 9 but incorporating the eccentric drive mechanism of the invention.

In describing the invention, the characteristics of an Oldham coupling will first be considered in detail for the reason that the action of the essential elements of this well-known form of shaft coupling is employed in the new driving mechanism of the invention. Thereafter, the means for counterbalancing the mechanism and typical applications of the drive will be described.

The Oldham coupling is a shaft coupling device interposed between adjoining ends of two shafts which are substantially extensions of each other but may be somewhat mutually eccentric or offset, that is, not in alignment but substantially parallel to each other. The one shaft is a more or less offset extension of the other. The function of the coupling is to transmit rotary motion from the input to the output shaft.

In its usual form, the Oldham coupling consists of three disks arranged side by side, the two outer disks being keyed on the shafts at their ends, the middle disk, sandwiched between the shaft disks, having two diametric feathers, one on each side and at right angles to each other, the shaft disks having diametric grooves in their inner faces into which the feathers of the middle disk fit. This type of mechanical coupling between adjoining disks is referred to herein as a feather and groove coupling. Motion of the input shaft disk is transmitted to the middle disk by means of the feather and groove coupling and rotation of the middle disk is, in turn, similarly transmitted to the output shaft disk resulting in rotation of the output shaft. Allowance is made for non-alignment of the input and output shafts by sliding of the middle disk feathers back and forth in the grooves of the shaft disks as the entire assembly rotates.

Such a mechanism, including positive means for establishing an offset between the input and output shafts, is illustrated in Figs. 1 and 2. Assuming shaft I to be the input and shaft 2 to be the output shaft, a shaft disk 3 is keyed upon shaft 1 and a shaft disk 4 is keyed upon shaft 2. These disks are provided at their inner faces with diametric grooves 5 and 6, respectively. A middle disk 7 is interposed between the shaft disks 3 and 4, feathers 8 and 9 rising above the opposite faces of middle disk 7 and fitting into slots 5 and 6.

Input shaft 1 is journaled in a suitably mounted supporting body or frame 10 and output shaft 2 is journaled in a bar 11 which is slidably supported at its free end in a slideway 12 in supporting body 10. A threaded shaft 13 extends from the opposite end of bar 11, this shaft being threaded into hand wheel 14 which is also mounted in the supporting body, as shown. The arrangement is such that turning of hand wheel 14 shifts the position of bar 11 and therefore of shaft 2 and shaft disk 4. In one position of bar 11, shafts 1 and 2 are in alignment.

It may be repeated here that the principal purpose of Figs. 1-7 of the drawings and the description thereof is to explain the mode of operation and the motion characteristics of the Oldham coupling, full comprehension of which is essential to an understanding of the invention herein.

In the mechanism shown in Fig. 1 in solid lines, input shaft 1 and output shaft 2 are in alignment. Under this condition, rotation of input shaft 1 results in the rotation of output shaft 2 without any sliding action between the feathers of middle disk 7 and the grooves of the shaft disks. In other words, middle disk 7 rotates about its axis which is continuously in alignment with the axes of shafts 1 and 2. When, however, output shaft 2 is offset with respect to input shaft 1, as, for example, in the position shown in dotted lines in Fig. 1, rotation of input shaft 1 forces middle disk 7 to slide back and forth in the grooves of the shaft disks in carrying out its function of transmitting the rotary motion to output shaft 2. The motion is illustrated in Figs. 3–7 wherein the disks 3, 4, and 7 are diagrammatically illustrated at 45° increments as shaft disk 3 is rotated clockwise as indicated by the arrow in Fig. 3. In these figures, the center of disk 3, which is the axis of input shaft 1, is indicated by the letter $a$, and the center of disk 4, which is the axis of output shaft 2 as shown in the dotted line position of Fig. 1, is indicated by the letter $b$. The center of middle disk 7 is indicated by the letter $c$.

A study of Figs. 3–7 show that ($a$) at every rotative position of the elements of the coupling, the center $c$ of middle disk 7 is always at the intersection of the center lines (indicated by the short crossing lines) of the shaft disk grooves, ($b$) in addition to rotation about its own center, middle disk 7 revolves with its center $c$ following a circular orbit $d$ the center of which is midway between the centers $a$ and $b$ of the respective shafts, ($c$) the amplitude of the movement in revolution, or eccentricity, of middle disk 7 is equal to the offset distance ($a-b$) between the input and output shafts, and ($d$) one complete revolutionary cycle of middle disk 7 is completed upon revolution of the shaft disks through 180° or one-half cycle.

It is this revolutionary movement of disk 7 that is utilized as the driving movement in accordance with the invention.

A counterbalanced Oldham coupling, applied as a drive mechanism, is illustrated in Fig. 8. The parts of this structure which correspond to the several parts of the device of Fig. 1 are indicated by the same reference numerals. Two Oldham coupling assemblies are employed, output disk 4 of the first coupling being fastened to input disk 3a of the second coupling to form a single disk unit 15 which may be conveniently designated as a control disk unit since its eccentricity, or offset, is established as a means for controlling the revolutionary amplitude of counterbalancing disk 7 and driving disk 7a. Control disk unit 15 is journaled in longitudinally adjustable bar 11. Alternatively, disks 4 and 3a may be keyed upon a common shaft element mounted in bar 11 for rotation of the disks. Either alternative arrangement may be used in the several embodiments of the invention shown herein.

The mechanism of Fig. 8 also illustrates an alternative arrangement which permits use of a continuous shaft, numerals 1 and 2 indicating the two ends of a single shaft. Clearance is provided, as shown by the dotted lines, for the lateral adjustment of disk unit 15 with respect to the shaft, and middle disks 7 and 7a are similarly provided with clearance bores, shown in dotted lines, to permit revolution of these elements in their orbits.

If disks 4 and 3a are so arranged with respect to each other that slots 6a and 5a are at right angles to each other, the middle disks 7 and 7a counterbalance each other in the assembly. As shown in Fig. 8, disk 7 is in its uppermost position and disk 7a is in its lowermost position; that is, the centers of the two middle disk elements are at diametrically opposite points upon their orbits of revolution. This condition is true for all rotative positions of the mechanism, the mechanism as a whole being thus statically counterbalanced. The orbital paths of middle disks 7 and 7a will be equal for all positions of bar 11. A suitable connecting rod 7c having a ring portion 7b encircling driving disk 7a transmits the eccentric movement of disk 7a in the form of reciprocating motion to an element to be driven by the mechanism shown.

The Oldham coupling elements, and particularly the counterbalanced unit of Fig. 8, is incorporated, in accordance with the invention, as the driving means of the two-cylinder reciprocating pump illustrated in Fig. 9. While the driving mechanism, with or without counterbalancing, is useful in many other applications as, for example, in transmission gearing and steering devices, the pump exemplification is sufficient to indicate the manner of its use.

In the pump of Fig. 9, the usual pistons 16 and 17 with connecting rods 18 and 19 connected thereto by means of wrist pins 20 and 21 are arranged to reciprocate in cylinders 22 and 23 in housing 24. Suitable inlet and outlet ports 25 and 26 are provided for passage of the fluid to be pumped.

An input shaft 27 is journaled in housing 24 and an input shaft disk 27a having a diametric groove 28 in the face thereof is keyed to the end of the shaft. A bar 29, having its free end slidably arranged within slideway 30 and its opposite end mounted in the housing by means of a threaded shaft 31 extending therefrom and into a hand wheel 32, supports a short shaft 33 journaled therein and having shaft disks 34 and 35 keyed to the respective ends thereof. Diametric grooves 36 and 37 in the faces of disks 34 and 35 are preferably at right angles to each other. Middle disks 38 and 39, having feathers 40 and 41, respectively, have provision for bearings 42 and 43 for connecting rods 18 and 19, respectively. A shaft 44 is journaled in the housing in alignment with input shaft 27 and may serve to transmit power to other equipment or may be cut off just beyond the housing journal. In either event, it serves to support shaft disk 45 which is keyed on it and is provided with a groove 46 to receive feather 41 of middle disk 39.

In operation, rotation of input shaft 27 by any suitable means drives the assembly of disks and shafts 33 and 44 in rotation, middle disks 38 and 39, revolving in an orbital path as described above. This movement in revolution, in turn, drives pistons 16 and 17 in reciprocation within the cylinders. By turning hand wheel 32, which may be rotated in its mounting in the housing but is fixed against axial movement, bar 29 is shifted in position with corresponding change in the eccentricity of shaft 33 with respect to concentric shafts 27 and 44. Greater eccentricity results in longer strokes of the pistons, the strokes of both pistons being equal, and reduced eccentricity results in corresponding reduction in the length of the stroke of the pistons. When shaft 33 is in alignment with shafts 27 and 44, there is no movement of the pistons because the diameter of the orbital paths of the driving middle disks 38 and 39 is zero.

In addition to adjustability of the stroke of the pistons of this pump, the device has the additional advantage of being counterbalanced for improved operation. Furthermore, the load upon the input shaft is substantially uniform throughout each cycle of the driving system.

By utilizing the eccentric drive of this invention, a multi-cylinder pump may be provided with very simple means for individually adjusting the stroke of each piston. Such a device is illustrated in Fig. 10. In this pumping unit, otherwise similar in construction to the pump of Fig. 9, an adjustable bar is provided for each piston to control the eccentricity of the driving disk of that piston. Thus bars 47, 48, and 49 carry shafts 50, 51, and 52 journaled respectively therein. The stroke of piston 53 depends upon the eccentricity of shaft 50 with respect to input shaft 54, and thus upon the position at which bar 47 is set by means of hand wheel 55. Similarly, the strokes of pistons 56 and 57 depend, respectively, upon the offset distance of shafts 50 and 51 and the offset distance of shafts 51 and 52. It will be noted that a change in the position of bar 47 will affect the stroke of piston 56, as well as piston 53, and a change in the position of bar 48 will affect the stroke of both pistons 56 and 57. Adjustment of bar 49, however, by means of wheel 58 will affect only the stroke of piston 57 since it is the control for the last piston and driving unit of the series.

Although previous figures of the drawings are more or less elemental in that they do not show details of any anti-friction devices, and simple sliding arrangements may be employed between cooperating feathers and grooves of the driving disks, the mechanical arrangement of the Oldham coupling drive elements illustrated in Figs. 11 and 12 exemplifies one expedient construction. Four pins 59 are suitably fixed at the corner points of a square and equidistant from the center of middle disk 60 which is the eccentric drive disk. Rollers 61 are arranged for free rotation upon projecting ends of pins 59 on one side of disk 60 and rollers 62 are arranged upon the ends on the other side of the disk. With this arrangement, feather 63 of shaft disk 64 rolls back and forth between rollers 61, and feather 65 of shaft disk 66 rolls back and forth between rollers 62. The guideways thus provided between the respective rollers are the full equivalents of the groove illustrated in other embodiments shown.

Figure 14:
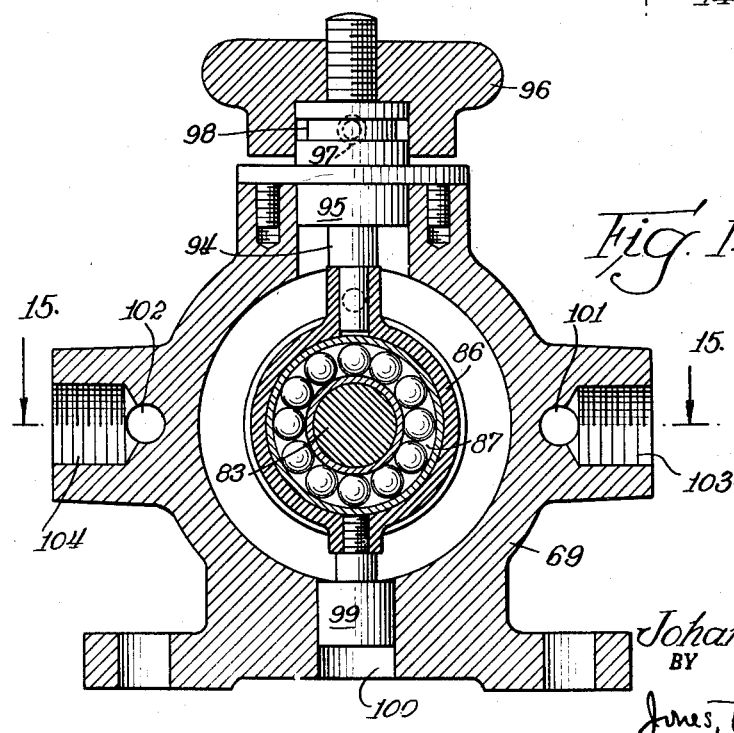
Fig. 14 is a cross-sectional view taken at the line 14—14 of Fig. 13.

A different form of variable discharge pump is illustrated in Figs. 13–17. This form of pump, while utilizing the eccentric drive mechanism hereinabove described, is more compact than the other forms shown and described in that the cylinders are located within the disks of the eccentric drive. Many other advantages of this form of the pump and the combination thereof with the eccentric drive mechanism of the invention will become readily apparent as the description proceeds.

Input shaft 67 is journaled at 68 in pump housing 69, a liquid seal 69a being provided to prevent leakage of liquid from within the pump housing. A thick input shaft disk or rotor 70 is fixed to shaft 67 for rotation within bore 71 of the pump housing. Disk 70 is co-axial with input shaft 67 and its diameter closely approaches that of bore 71 to minimize flow of liquid between the cylindrical surface of disk 70 and bore 71.

The inner face of disk 70 is provided with a diametrical feather 72 received within a corresponding diametrical groove 73 in the adjacent face of middle or drive disk 74.

A cylindrical bore 75 is provided within the body of disk 70 with the axis thereof parallel with feather 72. Bore 75 constitutes one of the two double-acting cylinders of the pump. A closely fitting cylindrical piston 76 is arranged for reciprocation within the bore 75, a drive pin 77 mounted in eccentric drive disk 74 at the axis thereof extending through a clearance slot 78 in disc 70 and feather 72 into a radial well 79 in the piston for driving the latter in reciprocation as drive disk 74 slides back and forth at the feather and groove coupling between the two disks.

A control disk 80 having a diametrical groove 81 to receive therein diametrical feather 82 of drive disk 74 and, on the opposite face thereof, a feather 83 slidably arranged in a corresponding groove 84 of a second drive disk 85, is supported by yoke 86 and ball bearing 87 for rotation about a center whose location may be varied along a diameter of bore 71. The final rotating element of the pump mechanism is disk 88, corresponding in structure and function to disk 70, coupled to the second drive disk 85 by means of diametrical groove 88a and a corresponding feather 89 of disk 85. Piston 90 is driven in reciprocation within cylinder 91 by pin 92 extending from eccentric drive disk 85. A cover plate 93 closes the end of the pump housing and may provide a bearing surface for the adjoining rotating disk.

As in the drive mechanisms hereinbefore described, each feather and groove coupling of the series of disks is at right angles to the next adjoining coupling.

It will be understood from the foregoing discussion of the eccentric drive mechanism of this invention that when control disk 80 is co-axial with input shaft 67, all five disks will rotate with the input shaft about their respective centers which are in alignment with the axis of the input shaft so that there is no eccentric driving movement and so sliding movement at the couplings between the disks. When the position of the control disk 80 is shifted to a position of eccentricity with respect to the axis of input shaft 67, rotation of the assembly by the input shaft results in the eccentric revolution of drive disks 74 and 85, the movement including relative reciprocation between the drive disks and the outer disks containing the two pump cylinders and pistons with the result that the pistons are respectively driven in reciprocation by connecting rods 77 and 92. The control and drive disks are smaller in diameter than the outer disks 70 and 88 to provide clearance.

The mechanism for controlling the degree of eccentricity of control disk 80, and thus the stroke of the pistons, includes a shaft 94 having its inner end fixed in yoke 86 and its outer end threaded and extending beyond a bearing block 95 mounted upon the pump housing. This protruding end of shaft 94 is threaded into a hand wheel 96 which wheel is held against axial movement by dog-pointed set screws 97 turned into a circular groove 98 in block 95. A slide guide 99 is also affixed to yoke 86 in line with shaft 94 and operates in guide hole 100 to support control disk 80 at any point along the axis of shaft 94 at which it may be located by the setting of hand wheel 96.

To complete the pump, intake and discharge passageways 101 and 102 are provided in the housing casting. Threaded connection openings 103 and 104 are for the connection of suitable piping to and from the pump. Collector grooves 105 and 106 are provided in bore 71 of the housing and are connected by ports 107 and 108 with passageway 101 and similar collector grooves 109 and 110 are connected with passageway 102 by ports 111 and 112. As is best seen in Figs. 16 and 17, the four collector grooves extend less than half way around the bore of the pump housing, leaving areas 113 and 114 having a span of at least the diameter of pump cylinders 75 and 91 to serve as barriers or seals between the inlet and discharge systems of the pump.

The several threaded elements 115 are merely plugs inserted to close the openings after completion of the drilling of the several passageways and ports in the housing casting.

The mode of operation of the pump of Figs. 13–17 will be apparent from the foregoing description. It may be pointed out that the mechanism is capable not only of controlling the rate of flow of liquid through the pump, but also of reversing the direction of flow with flow control throughout the entire range from a maximum discharge in one direction to the maximum discharge in the opposite direction. Each of the two pistons is both sucking and forcing at the same time. With reference to Fig. 16, for example, the piston is shown midway between the two extremes of its stroke, this position being that of the pump with the control disk 80 in concentric position, in which event no liquid is pumped in either direction, or the piston may, for example, be moving from left to right to draw liquid into the cylinder on the left side of the piston and forcing it out of the cylinder and into collector groove 109 on the right side of the piston. In Fig. 17, the piston is shown at the end of a stroke with the control disk 80 in its position of maximum eccentricity. The cylinder above the piston is substantially filled with liquid which will be forced out into the collector groove as the disk element continues to rotate.

The two-piston pump illustrated and described is intended to exemplify the invention. It will be understood that a similar mechanism, employing the same mode of operation may be used in a single piston pump or in a multiple piston pump. In the two-piston pump shown, the pistons are at right angles to each other, with the result that the discharge from the pump is a continuous flow.

It will be understood that in the commercial form of devices employing a mechanism of the invention, the particular designs of the several elements may differ from those shown herein. The novel mechanism is adaptable to a wide variety of applications as those familiar with mechanical motion and power transmission problem will appreciate. It is intended that the scope of the invention will be limited only by the appended claims.

Invention is claimed as follows:

1. A pump including a housing having a cylindrical bore therein and intake and discharge ports connecting with said bore and comprising an input shaft journaled in said housing co-axially with said bore, an input shaft disk keyed upon said input shaft and arranged for rotation therewith within said bore, the diameter of said disk being substantially that of said bore, an eccentric drive disk coupled with said input shaft disk by a diametric feather and groove coupling, a control disk coupled with said drive disk on the side thereof opposite said input shaft disk by a diametric feather and groove coupling at right angles to said first mentioned coupling, means for supporting said control disk for rotation about an axis offset relatively to the input shaft whereby to constrain said drive disk to reciprocate with respect to said input shaft disk, said input shaft disk having a diametric bore therein parallel to said coupling between said input shaft disk and said drive disk, a piston disposed for reciprocation within said diametric bore, and a connecting rod extending between said drive disk and said piston in driving relation thereto.

2. A pump in accordance with claim 1 wherein the means supporting the control disk is adjustable whereby the offset distance may be varied.

3. A pump in accordance with claim 1 and including a second eccentric drive disk coupled with the control disk by diametric feather and groove coupling, a fifth disk coupled with said control disk by a diametric feather and groove coupling at right angles to said coupling between said control disk and said second drive disk, said fifth disk having a diametric bore therein parallel to said coupling between said drive disk and said fifth disk, a second piston disposed for reciprocation within said diametric bore, and a second connecting rod extending between said second drive disk and said fifth disk in driving relation thereto.

4. A pump in accordance with claim 3 wherein the coupling between the control disk and the second drive disk is at right angles to the coupling between the first-mentioned drive disk and said control disk and the bore in the fifth disk is at right angles to the bore in the inlet shaft disk.

References Cited in the file of this patent

UNITED STATES PATENTS

| | | |
|---|---|---|
| 1,470,559 | Hall | Oct. 9, 1923 |
| 1,470,561 | Hall | Oct. 9, 1923 |
| 1,909,046 | Davis et al. | May 16, 1933 |
| 2,011,147 | Haselau | Aug. 13, 1935 |
| 2,016,812 | Benedek | Oct. 8, 1935 |
| 2,018,692 | Waite | Oct. 29, 1935 |
| 2,503,907 | Hefler | Apr. 11, 1950 |

UNITED STATES PATENT OFFICE

CERTIFICATE OF CORRECTION

Patent No. 2,932,255                                  April 12, 1960

Johannes Neukirch

It is hereby certified that error appears in the printed specification of the above numbered patent requiring correction and that the said Letters Patent should read as corrected below.

Column 6, line 9, for "and so" read -- and no --.

Signed and sealed this 13th day of September 1960.

(SEAL)
Attest:

KARL H. AXLINE                                      ROBERT C. WATSON
Attesting Officer                                    Commissioner of Patents